United States Patent [19]

Hester, Jr.

[11] 3,857,854
[45] Dec. 31, 1974

[54] TRANQUILIZER 6-PHENYL-1H,4H [1,2,4]OXADIAZALO[4,3-a][1,4] BENZODIAZEPIN-1-ONES

[75] Inventor: Jackson B. Hester, Jr., Galesburg, Mich.

[73] Assignee: The Upjohn Company, Kalamazoo, Mich.

[22] Filed: May 2, 1973

[21] Appl. No.: 356,372

Related U.S. Application Data

[63] Continuation-in-part of Ser. No. 178,792, Sept. 8, 1971, abandoned.

[52] U.S. Cl. ....... 260/307 A, 260/239 BD, 424/272
[51] Int. Cl. ............................................ C07d 85/52
[58] Field of Search ................................. 260/307 A

[56] References Cited
OTHER PUBLICATIONS

Hester et al.–Tetrahedron Letters 20, 1609–11 (1971).
Behr – "Five- and Six-Membered Compounds With Nitrogen And Oxygen" – (1962)–Intersc. Publ. p. 256.

*Primary Examiner*—Raymond V. Rush
*Attorney, Agent, or Firm*—Hans L. Berneis

[57] ABSTRACT

6-Phenyl-1H,4H-[1,2,4]oxadiazolo[4,3-a][1,4]benzodiazepin-1-ones of the formula II:

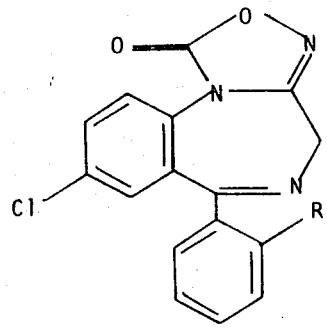

II

R is hydrogen or chlorine and is prepared by reacting 7-chloro-2-(hydroxyamino)-5-phenyl-3H-1,4-benzodiazepine with phosgene in the presence of a base.

The invention further comprises the pharmacologically acceptable acid addition salts of compounds of formula II.

These compounds and acid addition salts thereof are useful tranquilizers for mammals.

5 Claims, No Drawings

TRANQUILIZER 6-PHENYL-1H,4H-[1,2,4] OXADIAZALO[4,3-2][1,4]BENZODIAZEPIN-1-ONES

CROSS REFERENCE TO RELATED APPLICATION

This application is a continuation-in-part of application Ser. No. 178,792 filed Sept. 8, 1971, and now abandoned.

BACKGROUND OF THE INVENTION

1. Field of the Invention

This invention is directed to new organic compounds and is particularly concerned with novel 8-chloro-6-phenyl-1H,4H-[1,2,4]oxadiazolo[4,3-a][1,4]benzodiazepin-1-ones and a process for the production thereof.

The novel compound and the process of production therefor can be illustratively represented as follows:

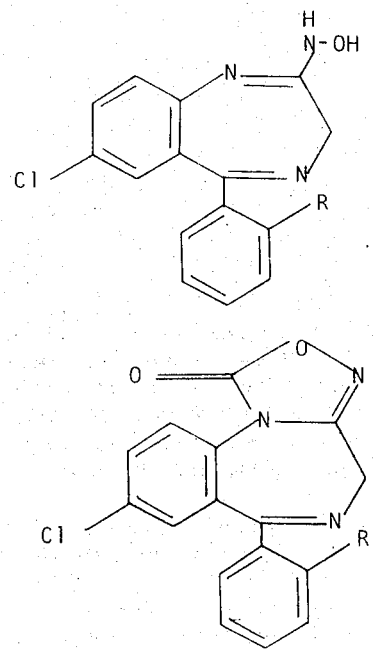

wherein R is hydrogen or chlorine.

The invention comprises also the pharmacologically acceptable acid addition salts of II.

The process of this invention comprises treating an 8-chloro-2-hydroxyaminobenzodiazepine I with phosgene in the presence of a base to obtain the oxadiazole compound II.

2. Description of the Preferred Embodiment

The acid addition salts of compounds of formula II contemplated in this invention, are the hydrochlorides, hydrobromides, hydriodides, sulfates, phosphates, cyclohexanesulfamates, methanesulfonates and the like, prepared by reacting a compound of formula II with an excess of the selected pharmacologically acceptable acid.

Sedative effects of 8-chloro-6-phenyl-1H,4H-[1,2,4]-oxadiazolo[4,3-a][1,4]benzodiazepin-1-one shown by the following tests in mice:

Chimney test: [Med. Exp. 4, 145 (1961)]: The effective intraperitoneal dosage for 50% of the mice ($ED_{50}$) is 79 mg./kg. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of the test compound at which 50% of the mice remain in the dish. The $ED_{50}$ (intraperitoneal administration) in this test is 7.1 mg./kg.

Pedestal test: The untreated mouse leaves the pedestal in less than a minute to climb back to the floor of the standard mouse box. Tranquilized mice will stay on the pedestal for more than 1 minute. The $ED_{50}$ (intraperitoneal administration) is 7.1 mg./kg.

Nicotine antagonism test: Mice in a group of 6 are injected with the test compound (8-chloro-6-phenyl-1H, 4H-[1,2,4]oxadiazolo[4,3-a][1,4]benzodiazepin-1-one. Thirty minutes later the mice including control (untreated) mice are injected with nicotine salicylate (2 mg./kg.). The control mice show overstimulation, i.e., (1) running convulsions followed by (2) tonic extensor fits followed by (3) death. An intraperitoneal dosage of 23 mg./kg. of the test compound protected 50% of the mice against (2) and 20 mg./kg. against (3) ($ED_{50}$).

Antagonism to strychnine (as sulfate): The effective dosage ($ED_{50}$) of 8-chloro-6-phenyl-1H,4H-[1,2,4]-oxadiazolo[4,3-a][1,4]benzodiazepine-1-one is 178 mg./kg. orally in mice. The test consists in orally administering into groups of 6 mice the test compound and 30 minutes later 3 mg./kg. strychnine sulfate intraperitoneally. The survivors after 4 hours reflect the activity of the compound as a muscle relaxant and antispasmodic. A dosage of 3 mg./kg. of strychnine sulfate is routinely fatal to all the control mice.

The pharmaceutical forms contemplated by this invention include pharmaceutical compositions suited for oral, parenteral and rectal use, e.g., tablets, powder packets, cachets, dragees, capsules, solutions, suspensions, sterile injectable forms, suppositories, bougies, and the like. Suitable diluents or carriers such as carbohydrates, lactose, proteins, lipids, calcium phosphate, cornstrach, stearic acid, methylcellulose and the like may be used as carriers or for coating purposes. Water or oil, e.g., sesame oil, safflower oil, cottonseed oil, peanut oil may be used for preparing solutions or suspensions of the active drug. Sweetening, coloring, and flavoring agents may be added.

For mammals and birds, food premixes, with starch, oatmeal, dried fishmeat, fishmeal, flour, and the like can be prepared.

As tranquilizers, the compounds of formula II can be used in dosage of 1–75 mg./kg. in oral or injectable preparations as described above, preferably from 5 to 65 mg./kg. to alleviate tension and anxiety in mammals, or birds, such as e.g., occurs when animals are in travel.

The starting products of this invention (formula 1); are produced as shown in the preparations.

In carrying out the process of this invention a 2-hydroxy amino-5-phenyl-3H-1,4-benzodiazepine (1) is allowed to react with phosgene in the presence of a base. In the preferred embodiment of this reaction, the base is an organic base e.g. triethylamine, tripropylamine, diethylbutylamine, pyridine, N-methylpiperidine or the like, dissolved in an organic solvent inert in this reaction, e.g. toluene, tetrahydrofuran, dioxane, diethylether, benzene or the like. The temperature is preferably kept low between 0° 10° C. while phosgene gas is bubbled into the mixture for 10–60 minutes. After the phosgene addition is terminated the reaction mixture is kept between 0°–50° C. for 0.5 to 2 hours.

The resulting 6-phenyl-1H,4H-[1,2,4]oxadiazolo[4,3-a]-[1,4]benzodiazepin-1-one is recovered and purified by standard procedures, such as removal of solvents and excess reactants, extraction, chromatography, and crystallization.

The following Preparation and Example is illustrative of the process and products of the present invention, but are not to be construed as limiting.

PREPARATION 1

2-(Hydroxyamino)-7-chloro-5-phenyl-3H-1,4-benzodiazepine

A mixture of 14.4 g. (0.05 mole) of 7-chloro-1,3-dihydro-5-phenyl-2H-1,4-benzodiazepine-2-thione, hydroxylamine hydrochloride (4.55 g.), sodium bicarbonate (5.45 g.) and methanol (250 ml.) is refluxed for 1.5 hours with a stream of nitrogen bubbling through the mixture. The cooled mixture is filtered and the filtrate is concentrated in vacuo to give a residue. This residue is chromatographed on silica gel (750 g.); 150-ml. fractions are collected. The product is eluted with 2% triethylamine-13% methanol-85% ethyl acetate and crystallized from ethyl acetate to give 4.92 g. of 2-(hydroxyamino)-7-chloro-5-phenyl-3H-1,4-benzodiazepine of melting point 122.5°–130° C. and 3.38 g. of melting point 128°–132° C. The analytical sample has a melting point of 126°–130° C.

Anal. calcd. for $C_{15}H_{12}ClN_3O$:
C, 63.05; H, 4.23; Cl, 12.41; N, 14.71.
Found:
C, 63.13; H, 4.40; Cl, 12.31; N, 14.52.

PREPARATION 2

2-(Hydroxyamino)-7-chloro-5-(o-chlorophenyl)-3H-1,4-benzodiazepine

A mixture of 14.4 g. (0.05 mole) of 7-chloro-1,3-dihydro-5-(o-chlorophenyl)-2H-1,4-benzodiazepine-2-thione, [J. Org. Chem. 29,231 (1964)], hydroxylamine hydrochloride (4.55 g.), sodium bicarbonate (5.45 g.) and methanol (250 ml.) is refluxed for 1.5 hours with a stream of nitrogen bubbling through the mixture. The cooled mixture is filtered and the filtrate is concentrated in vacuo to give a residue. This residue is chromatographed on silica gel (750 g.); 150-ml. fractions are collected. The product was eluted with 2% triethylamine-13% methanol-85% ethyl acetate and crystallized from ethyl acetate to give 2-(hydroxyamino)-7-chloro-5-(o-chlorophenyl)-3H-1,4-benzodiazepine.

EXAMPLE 1

8-Chloro-6-phenyl-1H,4H-[1,2,4]oxadiazolo[4,3-a]-[1,4]benzodiazepin-1-one

A stirred solution of 7-chloro-2-(hydroxyamino)-5-phenyl-3H-1,4-benzodiazepine (2.86 g., 0.0100 mole) and triethylamine (3.05 ml., 0.0220 mole) in dry toluene is cooled in an ice bath under nitrogen. Phosgene (0.795 ml., 0.011 mole) is evaporated into this mixture during 20 minutes. Excess phosgene is removed by bubbling a slow stream of nitrogen through the mixture which is removed from the ice bath and allowed to stand at ambient temperature for 1 hours 15 minutes. The mixture is then poured into ice water and extracted with chloroform. The extract is dried over anhydrous sodium sulfate and concentrated in vacuo. The residue is crystallized from ethyl acetate-Skellysolve B hexanes to give: 1.56 g. of 8-chloro-6-phenyl-1H,4H-[1,2,4]oxadiazolo[4,3-a][1,4]benzodiazepin-1-one. The analytical sample has a melting point of 191°–192° C.

Anal. calcd. for $C_{16}H_{10}ClN_3O_2$:
C, 61.65; H, 3.23; Cl, 11.39; N, 13.48.
Found:
C, 61.90; H, 3.22; Cl, 11.39; N, 13.78.

EXAMPLE 2

8-chloro-6-(o-chlorophenyl)-1H,4H-[1,2,4]oxadiazolo[4,3-a][1,4]benzodiazepin-1-one In the manner given in Example 1, 2-hydroxyamino-7-chloro-5-(o-chlorophenyl)-3H-1,4-benzodiazepine is reacted at low temperature with phosgene in the presence of triethylamine to give 8-chloro-6-(o-chlorophenyl)-1H,4H-[1,2,4]oxadiazolo[4,3-a][1,4]benzodiazepin-1-one.

Treating the compound of formula II with a pharmacologically acceptable acid such as hydrochloric, hydrobromic, phosphoric, sulfuric, acetic,propionic, toluene-sulfonic, methanesulfonic, tartaric, citric, lactic, malic, maleic, cyclohexanesulfamic acids produces the pharmacologically acceptable salts of the compound of formula II which can be used like the free base compound of formula II. Salt formation is achieved in conventional manner by reacting the compound of formula II with excess of a selected acid in a suitable medium e.g. water, a lower alkanol, ether, or acetone and recovering the salt by evaporating the solvent, preferably in vacuo.

I claim:

1. A compound selected from the group consisting of a 6-phenyl-1H,4H-[1,2,4]oxadiazolo[4,3-a][1,4]benzodiazepin-1-one of the formula II

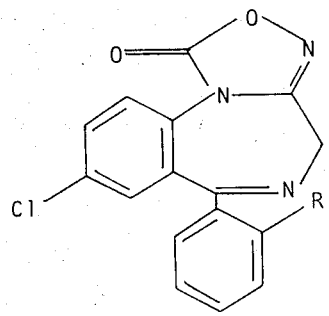

II wherein R is hydrogen or chlorine and the pharmacologically acceptable acid addition salts thereof.

2. A compound according to claim 1 wherein R is hydrogen and the compound is therefore 8-chloro-6-phenyl-1H,4H-[1,2,4]oxadiazolo[4,3-a][1,4]benzodiazepin-1-one.

3. A compound according to claim 1 wherein R is chloro and the compound is therefore 8-chloro-6-(o-chlorophenyl)-1H,4H-[1,2,4]oxadiazolo[4,3-a][1,4]benzodiazepin-1-one.

4. A process for the production of a 6-phenyl-1H,4H-[1,2,4]oxadiazolo[4,3-a][1,4]benzodiazepin-1-one of the formula II

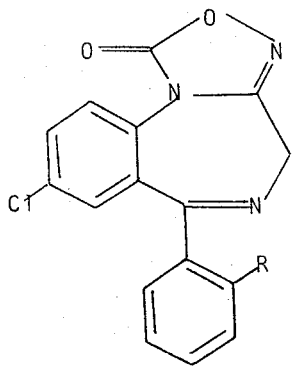

wherein R is hydrogen or chlorine, which comprises the step: treating at 0° to 10°C. a solution of 7-chloro-2-(hydroxyamino)-5-phenyl-3H-1,4-benzodiazepine of the formula I

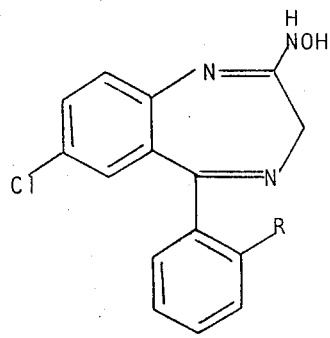

wherein R is defined as above, in an organic solvent, inert in the reaction with phosgene, in the presence of an organic base to obtain the corresponding 6-phenyl-1H,4H-[1,2,4]-oxadiazolo-[4,3-a][1,4]benzodiazepin-1-one of above.

5. The process of claim 1 wherein the solvent is toluene.

* * * * *